(131.)
CALEB V. LITTLEPAGE.
Improvement in Saws.
No. 121,950.
Patented Dec. 19, 1871.
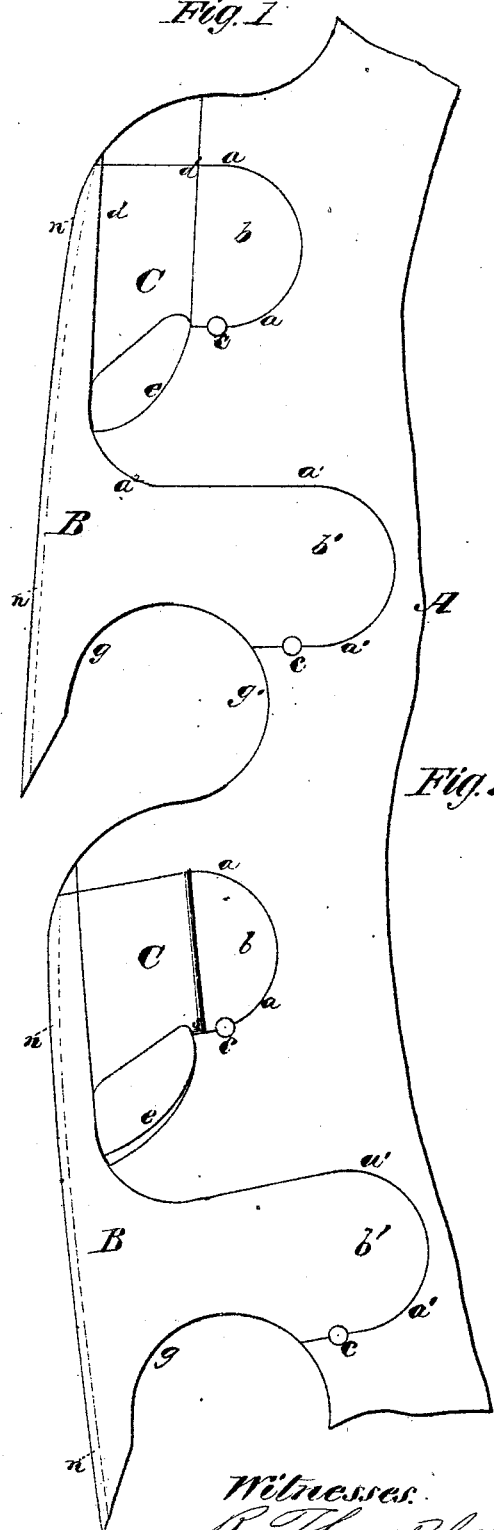
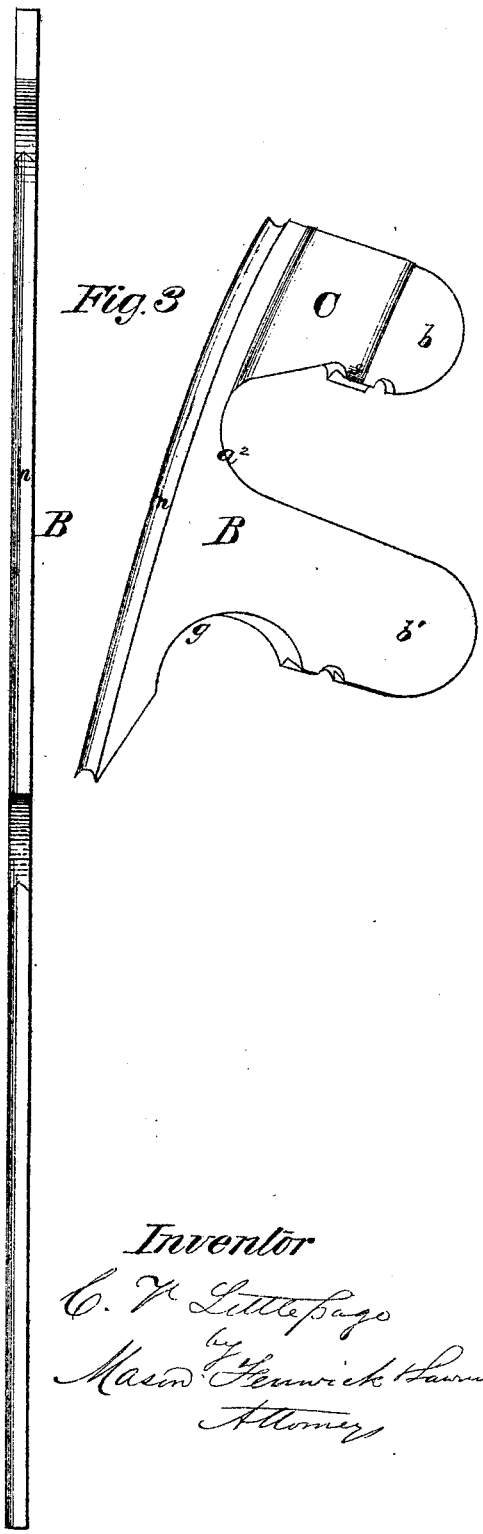
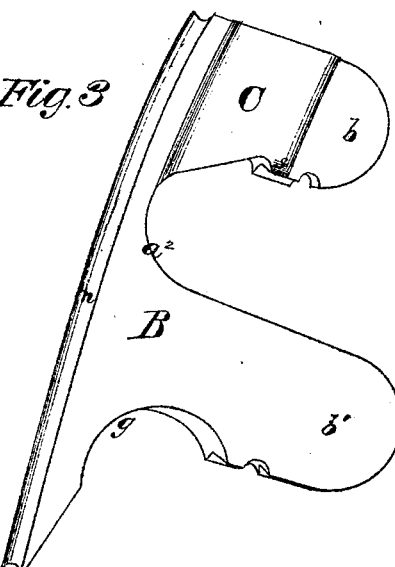
Fig. 1
Fig. 2
Fig. 3
Witnesses.
Inventor
C. V. Littlepage
by Mason Fenwick Lawrence
Attorneys

// 121,950

UNITED STATES PATENT OFFICE.

CALEB V. LITTLEPAGE, OF AUSTIN, TEXAS.

IMPROVEMENT IN SAWS.

Specification forming part of Letters Patent No. 121,950, dated December 19, 1871.

*To all whom it may concern:*

Be it known that I, CALEB V. LITTLEPAGE, of Austin, in the county of Travis and State of Texas, have invented certain Improvements in Saws; and I do hereby declare that the following is a full, clear, and exact description thereof, reference being had to the accompanying drawing making part of this specification, in which—

Figure 1 is a view of a portion of a circular-saw blade having two sawing and two planing teeth applied to it. Fig. 2 is an edge view of Fig. 1. Fig. 3 is a perspective view of one tooth with a planing-cutter attached.

Similar letters of reference indicate corresponding parts in the several figures.

This invention relates to certain improvements which are applicable either to circular or straight saws, and wherein planing-knives are employed substantially as described in my Letters Patent dated on the 26th day of April, 1870.

The following description of my invention will enable others skilled in the art to understand it.

In the accompanying drawing I have represented a portion of a saw-blade, A, of a circular saw, having two sawing-teeth, B B, inserted into it, and also two planing or shaving teeth. The periphery of each tooth B has a groove, $n$, in it, which extends from point to heel, and which may be angular or curved when taken transversely. This groove in each tooth serves a very important purpose, especially in saws having very thin blades, as it leaves in the end of the kerf a corresponding ridge or elevation, which holds and steadies the saw and prevents lateral trembling or vibration; consequently the saw is prevented from buckling or unduly heating, and, as the said ridge formed by the grooved teeth is always in the center of the kerf, the saw will be prevented from a straight course while sawing lumber having crooked grain. This feature of my invention is applicable to reciprocating saws as well as to circular saws, and also to solid saws as well as to saws having inserted teeth.

In the annexed drawing I have represented planing-cutters C applied to inserted teeth. This is effected by scoring the blade A, as shown at $a$ $a'$ and $e$, and constructing each tooth B with tongues $b$ $b'$, adapted to fit snugly into said scores. Each tooth is constructed with a rear extension, which extends across the score or throat $e$, and has formed on it the planing-cutter and the said tongue $b$. The planing-cutters C present raised oblique cutting-edges on opposite sides of the saw alternately, so as to plane both sides of the kerf at the same time. Each cutter has a grooved clearance, $d$, for the free discharge of the shavings, and each cutter on its raised side presents at its junction with the termination of the throat $e$ nearest the center of the saw a curved cutting-edge and a raised rounded surface, $s$, the object of which is to leave the dressed surface of the wood smooth. If the planing-edge terminated in a flat short angle ridges would be left on the surface of the dressed stuff, but the rounded edge described obviates this difficulty.

The sawing-tooth B and the cutter C being made of a single piece of metal and secured in place by means of transverse rivets $c$ and tongue-and-grooved edges, it will be seen that there is no liability of such a tooth becoming loose and dropping out of the saw. The forward tongue $b'$ and the rear tongue $b$ mutually support and strengthen the other and enable me to use a long tooth and a strong one.

Having described my invention, what I claim as new is—

A planer and saw-tooth combined in one piece, substantially as shown and described.

CALEB V. LITTLEPAGE.

Witnesses:
J. N. CAMPBELL,
EDM. F. BROWN.

(131)